(12) United States Patent
Velazco

(10) Patent No.: US 12,015,472 B2
(45) Date of Patent: Jun. 18, 2024

(54) INTERPLANETARY NETWORKS FOR SPACE INTERNET AND SPACE POSITIONING

(71) Applicant: CALIFORNIA INSTITUTE OF TECHNOLOGY, Pasadena, CA (US)

(72) Inventor: Jose E. Velazco, Altadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 251 days.

(21) Appl. No.: 17/696,679

(22) Filed: Mar. 16, 2022

(65) Prior Publication Data

US 2022/0302999 A1 Sep. 22, 2022

Related U.S. Application Data

(60) Provisional application No. 63/163,689, filed on Mar. 19, 2021.

(51) Int. Cl.
*H04B 7/185* (2006.01)
*H01Q 3/26* (2006.01)

(52) U.S. Cl.
CPC ....... *H04B 7/18521* (2013.01); *H01Q 3/2676* (2013.01); *H04B 7/18528* (2013.01)

(58) Field of Classification Search
CPC ...... H04B 7/15; H04B 7/185; H04B 7/18521; H04B 7/18528
See application file for complete search history.

(56) References Cited

U.S. PATENT DOCUMENTS

| | | | |
|---|---|---|---|
| 10,581,525 B2 | 3/2020 | Velazco | |
| 10,707,966 B2 | 7/2020 | Velazco | |
| 2008/0151811 A1 | 6/2008 | El-Damhougy et al. | |
| 2009/0154391 A1* | 6/2009 | Wittenschlaeger | ... H04W 76/20 370/316 |
| 2017/0280211 A1* | 9/2017 | Damaghi | ............... H04J 14/005 |
| 2017/0373754 A1* | 12/2017 | Davis | ................. H04B 10/1123 |
| 2021/0306071 A1 | 9/2021 | Velazco | |

FOREIGN PATENT DOCUMENTS

| | | | | |
|---|---|---|---|---|
| CN | 110474671 A | * | 11/2019 | ......... H04B 7/18502 |
| KR | 101701638 B1 | | 2/2017 | |

OTHER PUBLICATIONS

Cichan et al. 69th International Astronautical Congress, Bremen, Germany, Oct. 1-5, 2018. (Year: 2018).*
International Search Report and Written Opinion for International Application No. PCT/US2022/020611 filed on Mar. 16, 2022 Mail Date: Jul. 4, 2022 10 pages.

(Continued)

*Primary Examiner* — Blane J Jackson
(74) *Attorney, Agent, or Firm* — Steinfl + Bruno LLP

(57) ABSTRACT

Interplanetary networks for space internet and space positioning are presented. The described networks deploy spacecraft swarms along the solar system to form a science and communications platform. The disclosed network nodes are placed around planetary Lagrange points. Creation of optical synthetic apertures using smallsat swarms for inter- and intranet communications is further described. Exemplary subnetworks such as the cislunar network are also presented.

15 Claims, 12 Drawing Sheets

(56) References Cited

OTHER PUBLICATIONS

Aguilar, A. C., et al., "Simultaneous Optical Links with the Inter-Satellite Omnidirectional Optical Communicator," in *IEEE Aerospace Conference Proceedings*, Mar. 2020. 9 Pages.

Alexander, J., et al., "Scientific Instrumentation of the Radio-Astronomy-Explorer-2 Satellite," *Astron. & Astrophys.*, vol. 40, No. 4, 1975. pp. 365-371. 8 Pages.

Armellin, R., et al., "Disposal strategies for spacecraft in lagrangian point orbits," in *24th AAS/AIAA Space Flight Mechanics Meeting*, Feb. 2014. 22 Pages.

Belov, K., et al., "A space-based decametric wave-length radio telescope concept," *Experimental Astronomy*, vol. 46, No. 2, 2018. pp. 241-284. 45 Pages.

Bentum, M. J., "Algorithms for direct radio detections of exoplanets in the neighbourhood of radiating host stars," *IEEE Aerospace Conference Proceedings*, vol. Mar. 2018, pp. 1-7. 8 p. doi: 10.1109/AERO.2018.8396590.

Bentum, M. J., et al., "Space-based ultra-long wavelength radio astronomy—An overview of today's initiatives," 2011 30th URSI General Assembly and Scientific Symposium, URSI Gass 2011, 2011, pp. 1-4. 5 pages.

Bentum, M. J, et al., "A novel astronomical application for formation flying small satellites," *International Astronautical Congress (IAC)*, vol. 3, 2009. 9 Pages.

Bentum, M. J., et al., "Low frequency astronomy - The challenge in a crowded RFI environment," 2011 *30th URSI General Assembly and Scientific Symposium*, URSIGASS 2011, No. 1, 2011 pp. 1-4. 5 Pages.

Bentum, M. J., et al., "The radio environment for a space-based low-frequency radio astronomy instrument," in *2019 IEEE Aerospace Conference*, Mar. 2019, pp. 1-7. 8 Pages.

Berkovic, G., et al., "Optical methods for distance and displacement measurements," *Adv. Opt. Photon.*, vol. 4, No. 4, Dec. 2012. pp. 441-471. 31 pages. Available Online: aop.osa.org/abstract.cfm?URI=aop-4-4-441.

Biswas, A., et al., "Status of NASA's deep space optical communication technology demonstration," in *International Conference on Space Optical Systems*, Okinawa, Japan, Nov. 2017. 6 Pages.

Boonstra, A., et al., "DARIS, a low-frequency distributed aperture array for radio astronomy in space," *61st International Astronautical Congress*, Prague, 2010. 8 pages.

Boroson, D. M., et al., "Overview and results of the lunar laser communication demonstration," Proc. SPIE 8971, Free-Space Laser Communication and Atmospheric Propagation XXVI, Mar. 6, 2014. Available Online: doi.org/10.1117/12.2045508. 13 Pages.

Budianu, A., et al., "Antenna architecture of a nano-satellite for Radio Astronomy," *IEEE Aerospace Conference Proceedings*, 2014. pp. 1-10. 11 Pages.

Budianu, A., et al., "Inter-satellite links for CubeSats," *IEEE Aerospace Conference Proceedings*, 2013. pp. 1-10. 11 Pages.

Cichan, T., et al., "Concept for a crewed lunar lander operating from the lunar orbiting platform—gateway," in *69th International Astronautical Congress (IAC)*, Oct. 2018. 11 Pages.

de Kok, M., et al., "CubeSat Array for Detection of RF Emissions from Exoplanets using Inter-Satellite Optical Communicators," 2020 IEEE Aerospace Conference, Presented at the Conference Mar. 12, 2020. 12 Pages. doi: 10.1109/AERO47225.

Ellingson, S. W., et al., "The long wavelength array," *Proceedings of the IEEE*, vol. 97, No. 8, Aug. 2009. pp. 1421-1430, 11 Pages.

Engelen, S., et al., "Olfar, a Radio Telescope Based on Nano-Satellites in Moon Orbit," *Annual AIAA/USU Conference on Small Satellites*, No. 3, pp. SSC10-III-6, 2010. 8 Pages.

Engelen, S., et al., "The road to OLFAR—a roadmap to interferometric long-wavelength radio astronomy using miniaturized distributed space systems," *64th IAC International Astronautical Congress*, 2013. 8 Pages.

Farquhar, R. W., "The utilization of halo orbits in advanced lunar operations," *Tech. Rep. Nasa TN D-6365*, Jul. 1971. 110 Pages.

Folta D., et al., "A survey of earth-moon libration orbits: Stationkeeping strategies and intra-orbit transfers," in *AIAA/AAS Astrodynamics Specialist Conference and Exhibit*, Aug. 16-19, 2014. 21 Pages. Available Online: arc.aiaa.org/doi/abs/10.2514/6.2004-4741.

Gao, Y.-x., et al., "Optimization design of configuration and layout for queqiao relay satellite," *Advances in Astronautics Science and Technology*, Jun. 2019. 2: 33-38. 7 Pages. Available Online: doi.org/10.1007/s42423-019-00034-0.

Grießmeier, J. -M., et al., "Observation of planetary radio emissions using large arrays," *Radio Science*, vol. 46, No. 5, Dec. 14, 2011. RSOF09. 9 Pages. Available Online: agupubs.onlinelibrary.wiley.com/doi/abs/10.1029/2011RS004752.

Gunst, A. W., et al., "The LOFAR phased array telescope system," *IEEE International Symposium on Phased Array Systems and Technology*, No. 1, 2010. pp. 632-639. 9 Pages.

Israel, D. et.al, "LunaNet: a Flexible and Extensible Lunar Exploration Communications and Navigation Infrastructure and the Inclusion of SmallSat Platforms," *Proceedings of the AIAA/USU 34th Conference on Small Satellites, Communications*, SSC20-XII-03. 2020. 7 Pages. Website: digitalcommons.usu.edu/smallsat/2020/all2020/171/.

Jester, S., et al., "Science with a lunar low-frequency array: From the dark ages of the Universe to nearby exoplanets," *New Astronomy Reviews*, vol. 53, No. 1-2, May 2009. pp. 1-26. 27 Pages. Available Online: dx.doi.org/10.1016/j.newar.2009.02.001.

Kasper, J., et al., "The Sun Radio Interferometer Space Experiment (SunRISE) Mission Concept," 2019 IEEE Aerospace Conference, pp. 1-11, 2019. 12 p.

Kelley, K., et al., "Deploying 87 Satellites in One Launch: Design trades completed for the 2015 SHERPA flight hardware," in *29th Annual AIAA/USU Conference on Small Satellites*, 2015. 8 Pages.

Khabbaz, M., et al., "Disruption-Tolerant Networking: A Comprehensive Survey on Recent Developments and Persisting Challenges," *Communications Surveys & Tutorials*, IEEE, vol. 14, Jan. 2012. pp. 1-34.

Lazio, T., et al., "The sun radio space imaging experiment (SunRISE)," 2017 *32nd General Assembly and Scientific Symposium of the International Union of Radio Science*, URSI GASS 2017, Aug. 2017. 5 Pages.

Lazio, T. J., et al., "The Radiometric Bode's Law and Extrasolar Planets," *The Astrophysical Journal*, vol. 612, Sep. 1, 2004. pp. 511-518. 9 Pages.

Maccone, C, "Nasa gateways at L1 and L2 and the radio-quiet moon farside imperative," *Acta Astronautica*, vol. 57, Jun. 2005. pp. 145-155. 12 Pages.

Marrese-Reading, C., et al., "Electrospray thruster performance with microfabricated emitter arrays and indium propellant," *52nd AIAA Joint Propulsion Conference*, Salt Lake City, Utah, Jul. 25-27, 2016. 16 Pages.

Moision, B., et al., "An Approximate Link Equation for the Direct-Detected Optical PPM Link," *Interplanetary Network Progress Report*, vol. 199, No. 27, Nov. 15, 2014. 14 Pages. Available Online: ipnpr.jpl.nasa.gov/progress_report/42-199/199A.pdf.

Nugent, R., et al., "The CubeSat: The Pico-Satellite Standard for Research and Education," *AIAA SPACE 2008 Conference*, 2008. 12 Pages.

Quillien, K. A., et al., "Astronomical antenna for a space-based low frequency radio telescope," 27th *Annual AIAA/USU Conference on Small Satellites*, 2013. 8 Pages.

Rajan, R. T., et al., "Joint ranging and synchronization for an anchorless network of mobile nodes," *IEEE Transactions on Signal Processing*, vol. 63, No. 8, Apr. 15, 2015. pp. 1925-1940. 17 Pages.

Rajan, R. T., et al., "Joint relative position and velocity estimation for an anchorless network of mobile nodes," *Signal Processing*, vol. 115, pp. 66-78, Oct. 2015. 14 Pages. Available Online: www.sciencedirect.com/science/article/pii/S0165168415000894.

Rajan, R. T., et al., "Orbiting low frequency array for radio astronomy," IEEE Aerospace Conference Proceedings, 2011. 12 Pages.

Rajan, R. T., et al., "Space-based aperture array for ultra-long wavelength radio astronomy," *Experimental Astronomy*, vol. 41, No. 1-2, 2016. pp. 271-306. 37 Pages.

(56) References Cited

OTHER PUBLICATIONS

Roybal, F., et al., "Development of an elastically deployable boom for tensioned planar structures," in *48th AIAA Structures, Structural Dynamics, and Materials Conference*, vol. 1838, pp. 1603-1616. Apr. 2007. 9 Pages.

Tummala, A.R., et al., "An overview cube-satellite propulsion technologies and trends," Aerospace, vol. 4, No. 4, Dec. 9, 2017. 30 Pages. Available Online: www.mdpi.com/2226-4310/Apr. 4, 58.

Velazco, J., "An Inter Planetary Network Enabled by SmallSats," 2020 IEEE Aerospace Conference, Date of Conference: Mar. 7-14, 2020, 10 Pages, doi: 10.1109/AERO47225.2020.9172696.

Velazco, J. E., et al., "Inter-satellite omnidirectional optical communicator for remote sensing," *SPIE Opt. Eng. + Appl.*, vol. 10769, 2018. 8 Pages.

Velazco, J. E., et al., "Q4—a CubeSat Mission to Demonstrate Omnidirectional Optical Communications," in *IEEE Aerospace Conference Proceedings*, 2020. 7 Pages.

Velazco, J., "Omnidirectional Optical Communicator," *2019 IEEE Aerospace Conference*, Mar. 2019. 7 Pages.

Velazco, J., "Presentation titled: An Inter Planetary Network Enabled by SmallSats," *2020 IEEE Aerospace Conference*, Presented Mar. 12, 2020. 25 Pages.

Woodard, M., et al., "ARTEMIS: The First Mission to the Lunar Libration Orbits," in *Proceedings of the 21st International Symposium on Space Flight Dynamics*, 2009. 15 Pages.

\* cited by examiner

INTERPLANETARY NETWORKS FOR SPACE INTERNET AND SPACE POSITIONING

CROSS REFERENCE TO RELATED APPLICATIONS

The present application claims priority to U.S. Provisional Patent Application No. 63/163,689 filed on Mar. 19, 2021 incorporated herein by reference in its entirety. The present application is also related to U.S. Pat. Pub. No. 2021/0306071 A1, published on Sep. 30, 2021, titled "Optical Ground Terminal", to U.S. Pat. No. 10,581,525 B2, issued on Mar. 3, 2020, titled "Method and Apparatus for Omnidirectional Optical Communication", and to U.S. Pat. No. 10,707,966 B2, issued on Jul. 7, 2020, titled "Ultrafast Omnidirectional Wireless Data Transfer Apparatus", all of which are incorporated herein by reference in their entirety.

STATEMENT OF GOVERNMENT GRANT

This invention was made with government support under Grant No. 80NM00018D0004 awarded by NASA (JPL). The government has certain rights in the invention.

FIELD

The present disclosure is related to interplanetary networks (IPN), and more particularly to IPN's for space internet and space positioning.

BACKGROUND

Typical space missions involve single flagship spacecraft furnished with a suite of sensors and communications system that cost up to $1B [1-2]. The science data generated by these missions is typically downlinked directly from the spacecraft to ground stations in the Deep Space Network [3] via X-band or Ka-band links. These flagship missions tend to be seasonal and include large communications systems to transmit their data back to Earth. The general issue with such approach is an overall prohibitive cost of deployment.

SUMMARY

According to a first aspect of the present disclosure, an interplanetary satellite network (IPN) deployed across a plurality of planets of a solar system is provided, the IPN comprising a plurality of miniaturized satellite swarms, each swarm forming a node of the IPN, the node being located at a Lagrange point of a corresponding planet with reference to the Sun, and wherein: the plurality of planets comprises Earth, Mercury, Venus, Mars, Jupiter, Saturn, Uranus, Neptune and Pluto, and each miniaturized satellite is configured to optically communicate with miniaturized satellites of a same swarm and miniaturized satellites of other swarms of the IPN.

Further aspects of the disclosure are provided in the description, drawings and claims of the present application.

DETAILED DESCRIPTION

Throughout the disclosure, the term "interplanetary network" refers to a large sensor and communication platform implemented across the solar system. The term "spacecraft swarm" refers to a plurality of spacecrafts, e.g. tens, hundreds or thousands of spacecrafts. The terms "Lunar Gateway", or "Gateway", refer to a planned small space station in lunar orbit intended to serve as a solar-powered communication hub, science laboratory, short-term habitation module for government-agency astronauts, as well as a holding area for rovers and other robots. The term "smallsat" refers to miniaturized satellites, i.e. satellites of low mass and size, usually under 1,200 kg.

According to the teachings of the present disclosure, space missions can also be carried out deploying interplanetary networks (IPNs) that involve the implementation of a spaceborne platform including, e.g. hundreds to thousands, of small spacecrafts placed along the solar system. According to such distributed approach, the IPN includes a plurality of nodes, wherein each node comprises spacecraft swarms used as building blocks of the IPN. In an embodiment, such spacecraft swarms are systematically placed on planetary Lagrange points to gradually form the interplanetary network.

Figure 1A:
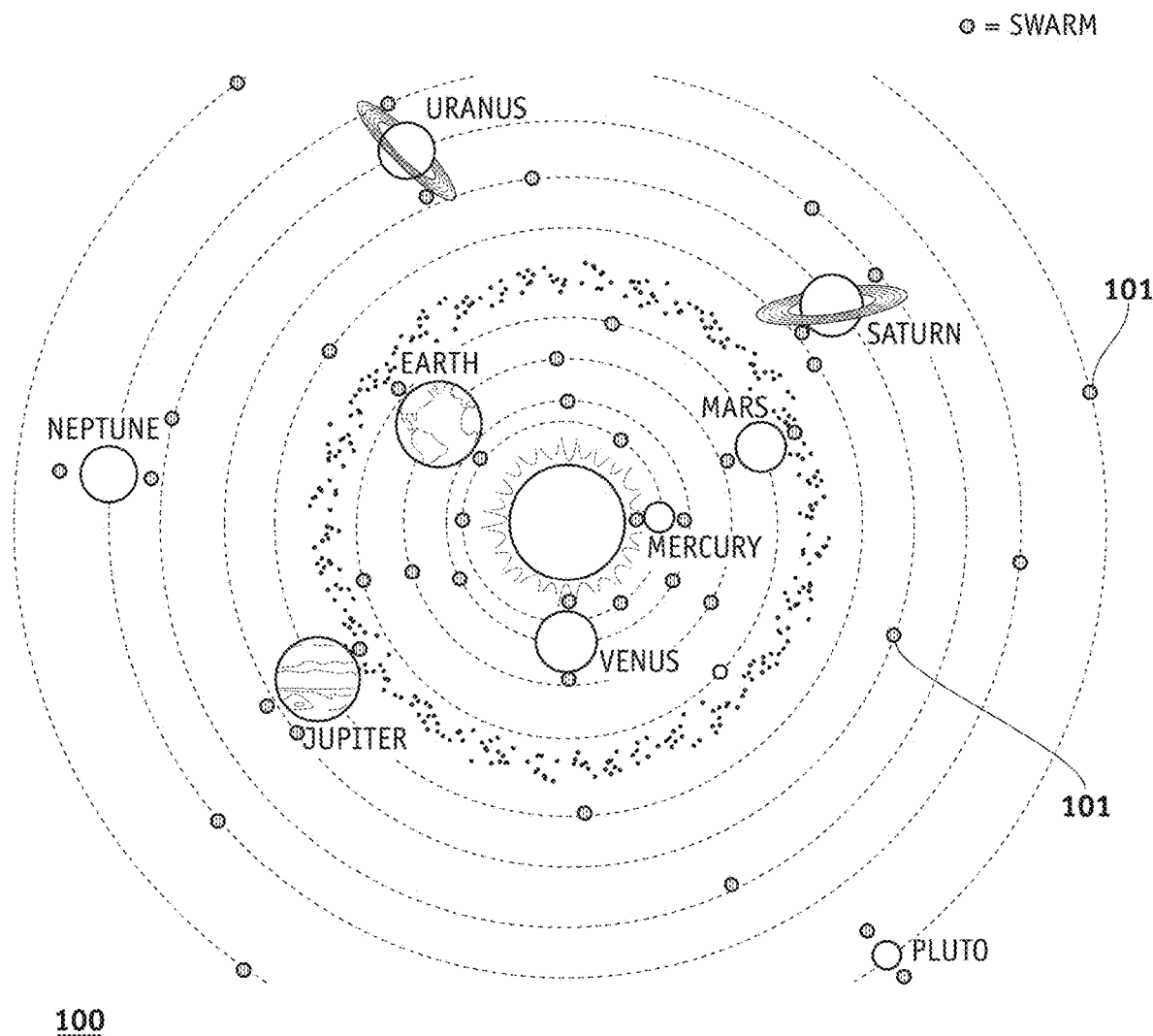
FIG. 1A shows an exemplary interplanetary network according to an embodiment of the present disclosure.
Figure 1B:
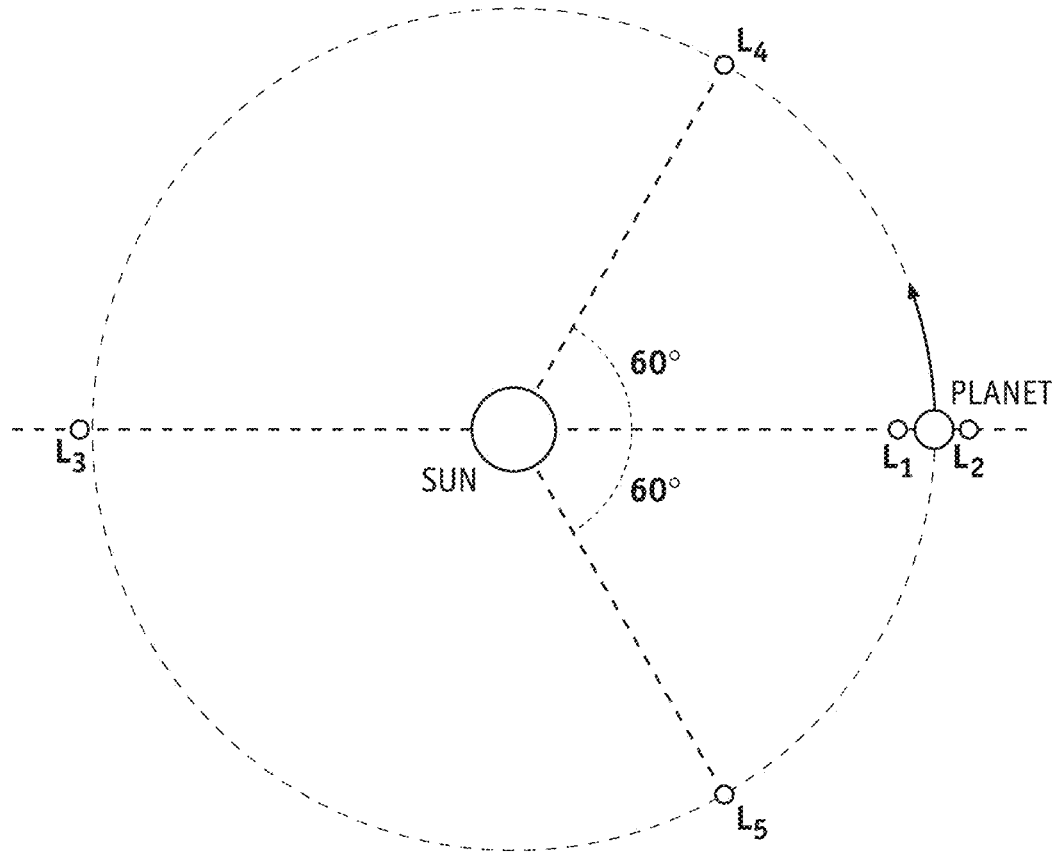
FIG. 1B shows Lagrange points between the Sun and a planet.

FIG. 1A shows an exemplary IPN (100) implemented across the solar system according to an embodiment of the present disclosure. IPN (100) comprises nodes (101), each including a spacecraft swarm (not shown). Spacecraft swarms may be disposed along planetary Lagrange points (Sun-planet L1-L5). This is illustrated in FIG. 1B, wherein the five Lagrange points (L1-L5) between the Sun and a planet are shown. Lagrange points are points of equilibrium for small-mass objects under the influence of two massive orbiting bodies (in this case Sun and a respective planet). They are well known as such to the person skilled in the art and will not be discussed here in detail.

Figure 2:
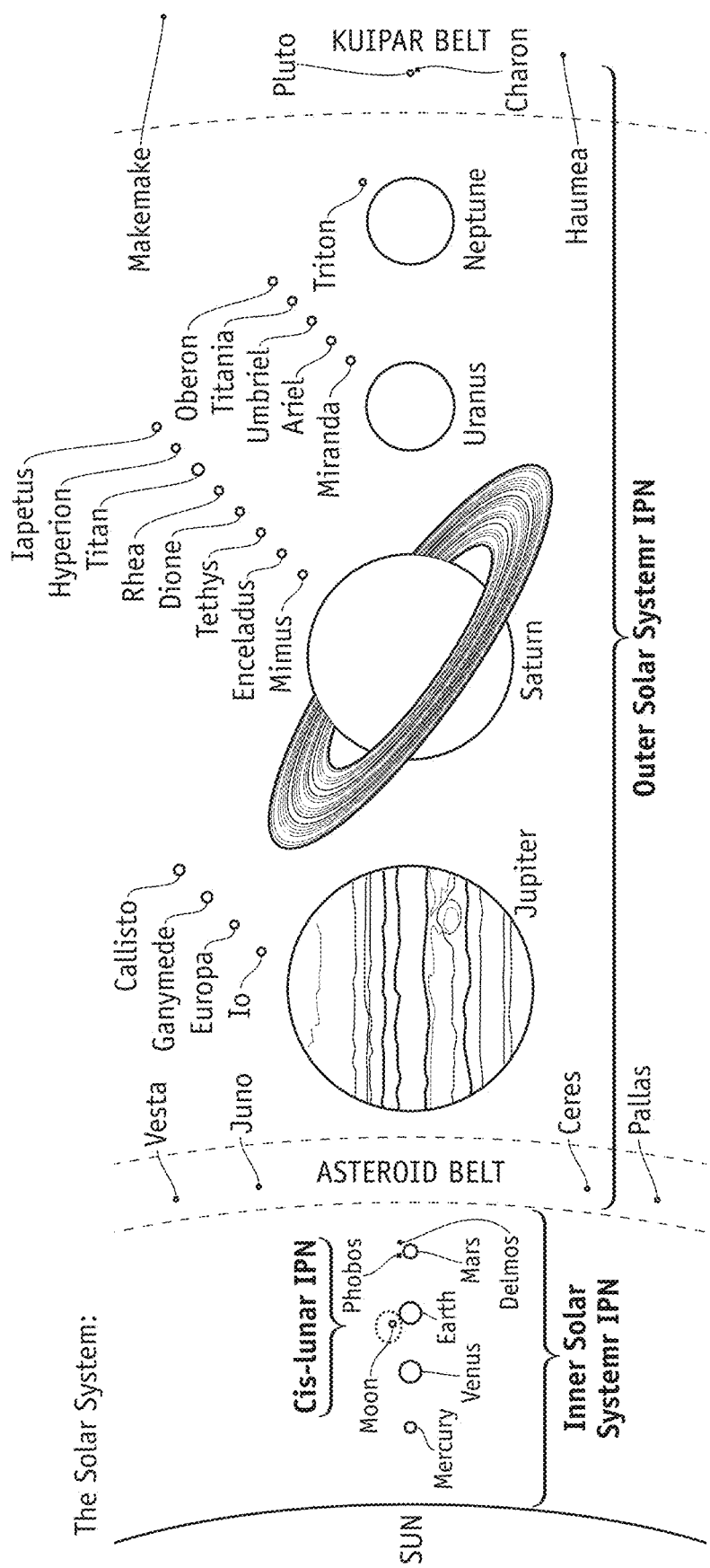
FIG. 2 shows subnets of an interplanetary network.

In the IPN (100) of FIG. 1A, at least one swarm per Lagrange point (5 swarms per planet) is placed along Earth, Mercury, Venus, Mars, Jupiter, Saturn, Uranus, Neptune and the dwarf planet Pluto. The deployment of a swarm on Lagrange point Earth-Moon L2 may also be envisaged. In another embodiment, 5 spacecraft swarms around dwarf planet Ceres Lagrange points may be placed (Sun-Ceres L1-L5). This makes for a total of 51 IPN swarms. According to the teachings of the present disclosure, IPN (100) can be divided into various subnetworks (hereafter referred to as subnets). As shown in FIG. 2, in an embodiment, the IPN (100) comprises 3 main subnets: cislunar IPN, inner solar system IPN, and outer solar system IPN. All the subnetworks may be fully networked and connected to Earth. In what follows, some mode details about the implementation of cislunar IPN will be given.

Figure 3:
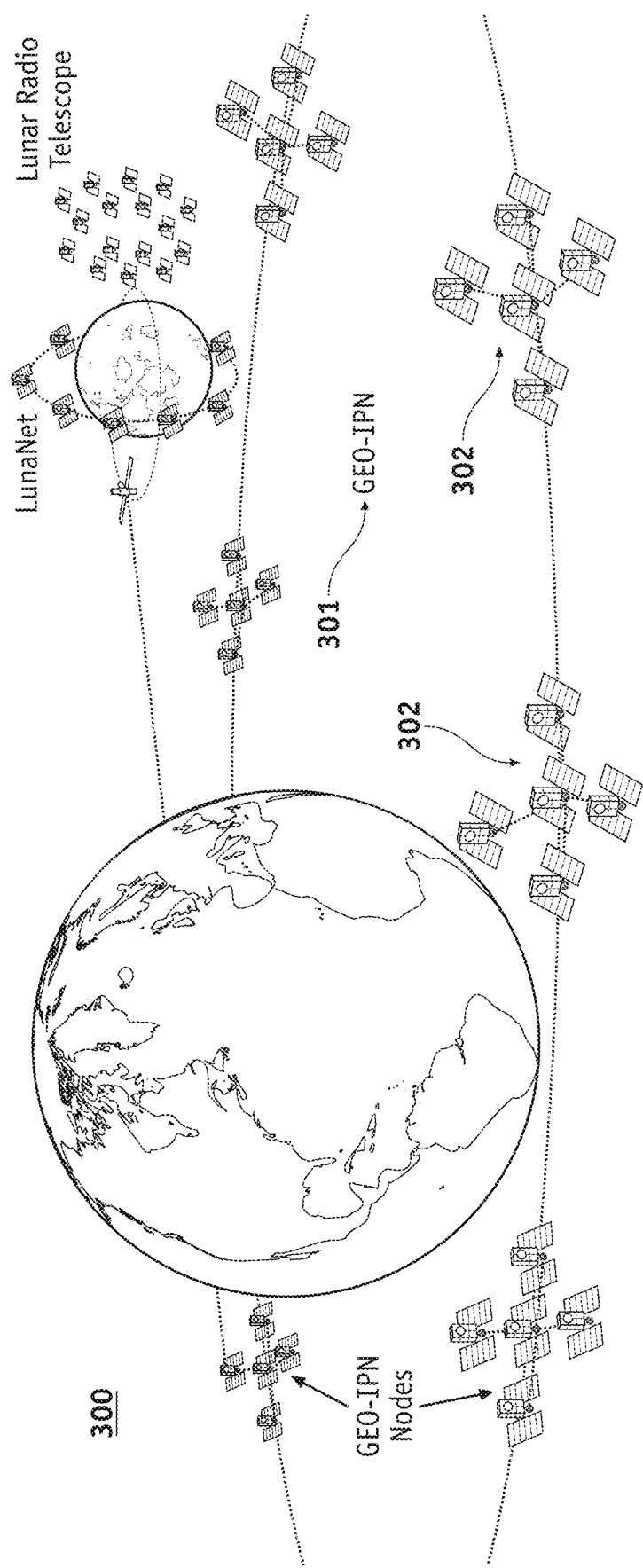
FIG. 3 shows an exemplary implementation of the cislunar inter planetary network according to an embodiment of the present disclosure.

FIG. 3 shows an exemplary implementation of the cislunar IPN (300) according to an embodiment of the present disclosure. Cislunar IPN (300) comprises a subnet in geostationary (GEO) orbit, called GEO-IPN (301) including a set of, for example, 8 swarms (302) equally spaced along the GEO orbit. NASA's current strategy includes the implementation of the lunar gateway orbiter (shown in FIG. 3) and lunar ground assets, such as astronauts, rovers and other instruments, as a stepping stone towards manned Mars missions. Also shown in FIG. 3, as part of cislunar IPN (300), in addition to the Gateway, the placement of a lunar radio telescope around L2 (Earth-Moon Lagrange point) [4] and a constellation of lunar orbiting smallsats (e.g. LunaNet [5]) for fast communications between the lunar gateway and surface assets may also be envisaged. In an embodiment, the Gateway may be used as the main communication relay between lunar assets and Earth ground stations.

With continued reference to FIG. 3, LunaNet is a lunar communications and navigation architecture that will bring networking, positioning, navigation and timing (PNT) and science services to the Moon [5]. Once the LunaNet architecture is in place, robotic landers, rovers and astronauts on the Moon will have network access similar to networks on Earth via the IPN. Rovers analyzing samples can send their data to relays orbiting the Moon, which can then transmit that data back to Earth. Astronauts on the lunar surface will be able to receive real-time alerts generated from space weather instruments of incoming solar flares, giving them ample time to seek cover and protect relevant instrumentation. Each communications link will be a connection to the larger IPN (100) of FIG. 1A, allowing fast data transfers between any assets on the network. LunaNet will also support PNT services and allow for more precise surface operations and science than ever before. Among the science instruments that would benefit from LunaNet's PNT is the lunar radio telescope [5] as shown in FIG. 3.

With further reference to FIG. 3, the GEO-IPN (301) has the main purpose of acting as a connectivity backbone for IPN ships. More specifically, it acts as a relay for IPN smallsats located not only in cislunar space but also in the inner and outer solar system. It also allows for redirecting signals along its 8 nodes in order to find an available ground station, in case of bad weather or unavailability of a given station. For instance, the GEO-IPN is able to transmit to and receive optical signals from the lunar gateway, LunaNet and the lunar CADRE radio telescope [5, 4].

Figure 4A:
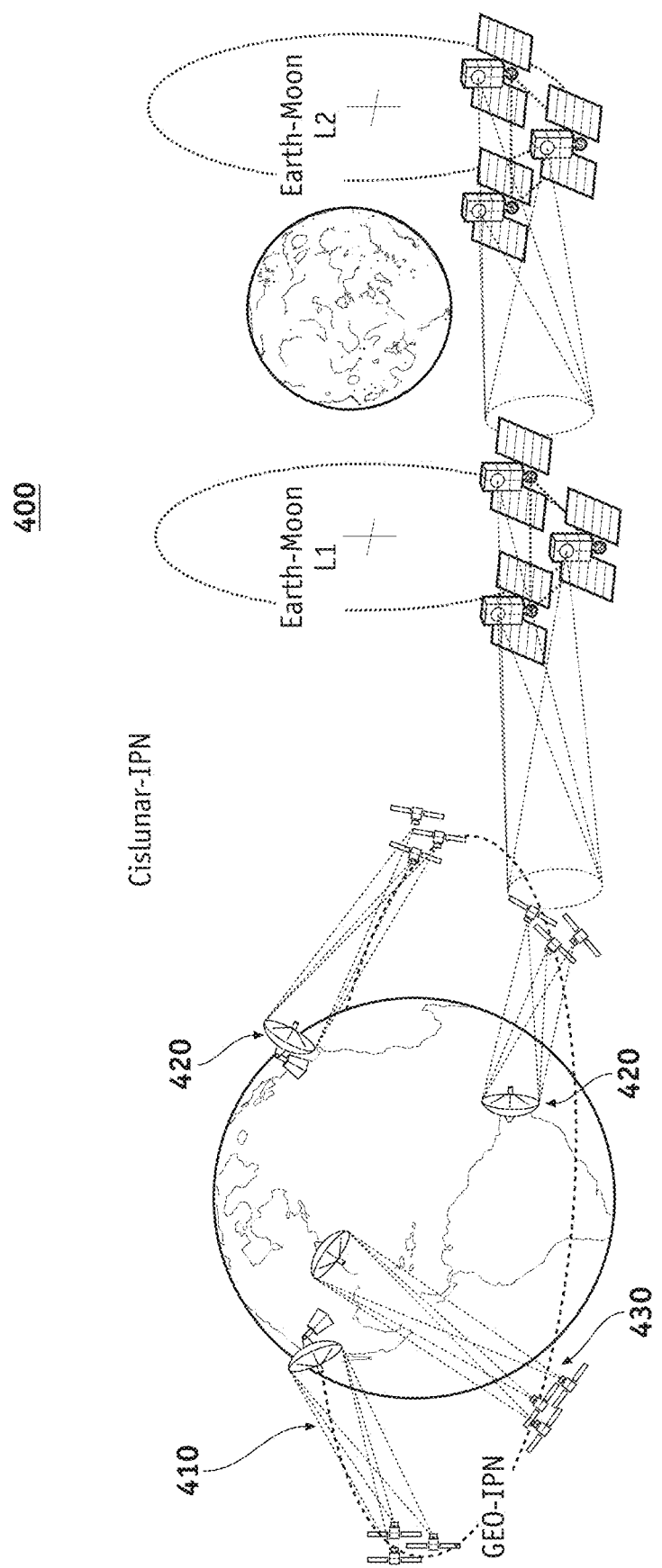
FIG. 4A shows an exemplary implementation of the cislunar inter planetary network according to an embodiment of the present disclosure.
Figure 4C:
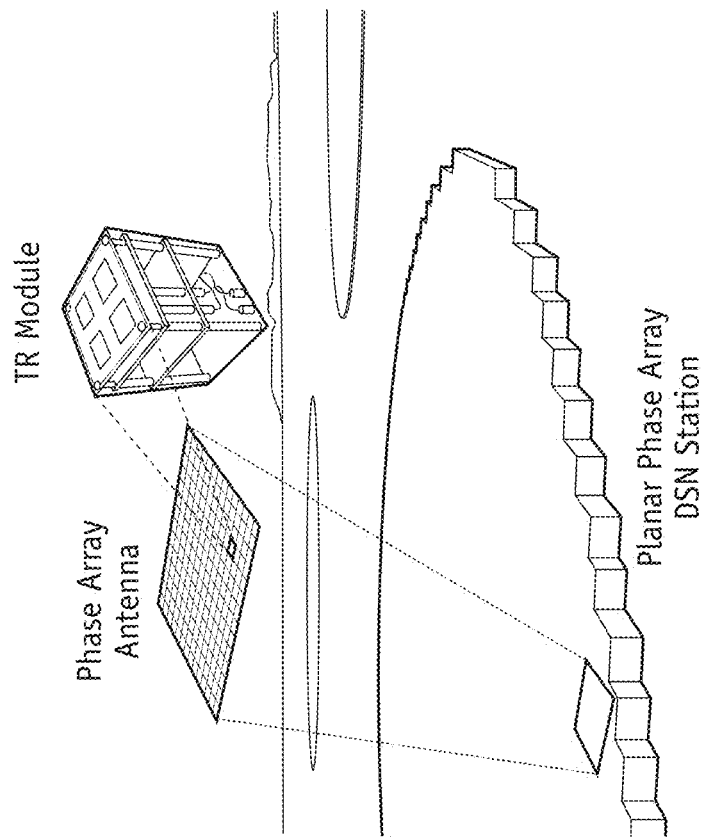
FIG. 4C shows a phase array RF station.
Figure 4B:
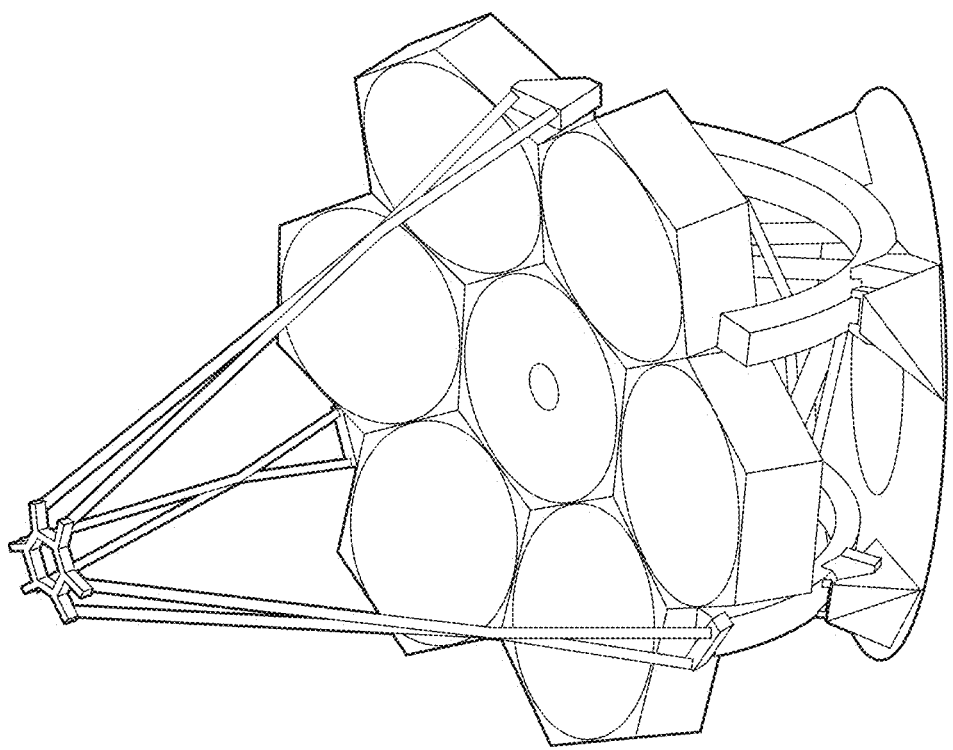
FIG. 4B shows an optical ground station.

FIG. 4A shows an exemplary Cis-lunar IPN (400) according to an embodiment of the present disclosure. Cis-lunar IPN (400) comprises (IGN) interplanetary ground network (410) including, for example, ground complexes (420). As an example, IPN ground network (410) may include up to 8 ground complexes spaced approximately 45 degrees apart in longitude. Such ground complexes may be disposed, for example, in Goldstone, California; Stafford, Virginia; Recife Brazil; Madrid, Spain; Mogadishu, Somalia; Singapore, Singapore; Canberra, Australia; and Hawaii. In an embodiment, Cislunar IPN (400) architecture includes nodes around GEO (430) as well as Earth-moon L1 and L2, as shown in FIG. 4A. Each complex of IGN (420) may host at least one optical ground station (as shown in FIG. 4B) and one phase array RF station (as shown in FIG. 4C). Each IGN complex will be dedicated for full-duplex connectivity with its corresponding GEO-IPN node.

With reference to FIGS. 3, 4A-4C, the ground terminals are configured to have large optical apertures, for example, 5-8-meter diameter. The IPN (300) of FIG. 3 may also deploy secure browser-based interfaces to users so they can have easy access to their science and commercial data. According to the teachings of the present disclosure, the data rates from deep space missions to increase approximately one order of magnitude per decade for the next 50 years. The first order of magnitude improvement will come from existing plans for radio frequency (RF) communications including enhancements to both spacecraft and Deep Space Network (DSN) facilities. The next two orders of magnitude are predicted to come from the introduction of deep space optical communications.

According to embodiments of the present disclosure, regarding the optical transmission and reception among smallsats, optical receive apertures of between 8 m to 12 m may be provided. In another embodiment, antennas can be implemented to include an 8 m segmented aperture. By utilizing a low-cost segmented spherical mirror optical design, and by exploiting the already existing extremely stable large radio aperture structures, both of these cost drivers for implementing large optical communications ground terminals can be minimized. For example, two collocated optical antennas could be arrayed to synthesize the performance of, for example, an 11.3 m receive aperture to support more capable or more distant space missions or used separately to communicate with two optical spacecraft simultaneously.

According to a preferred embodiment, optical connectivity is used across the IPN, although RF stations should still be considered in an auxiliary role. The phase array antennas of FIG. 4C, may have relatively large (several meters) diameters, providing graceful degradation and high gain. The phase array antennas of FIG. 4C may operate alone or arrayed together depending on the connectivity need. The IPN ground complexes may be fully interconnected via high-speed fiber optic networks. The optical telescopes deployed in ground terminals are designed be fast and large enough to provide, for example, tens of gigabits. connectivity with spacecraft operating in cislunar and Martian space.

As disclosed above, a building block for the IPN is the use of distributed systems in the form of spacecraft swarms, a cluster of smallsats that are autonomous and carry miniature instruments. By using autonomous and miniaturized systems, the IPN distributed systems should offer lower operational, manufacturing, and mission costs. As an example, each spacecraft may be a 6 U or 12 U smallsat.

Figure 5:
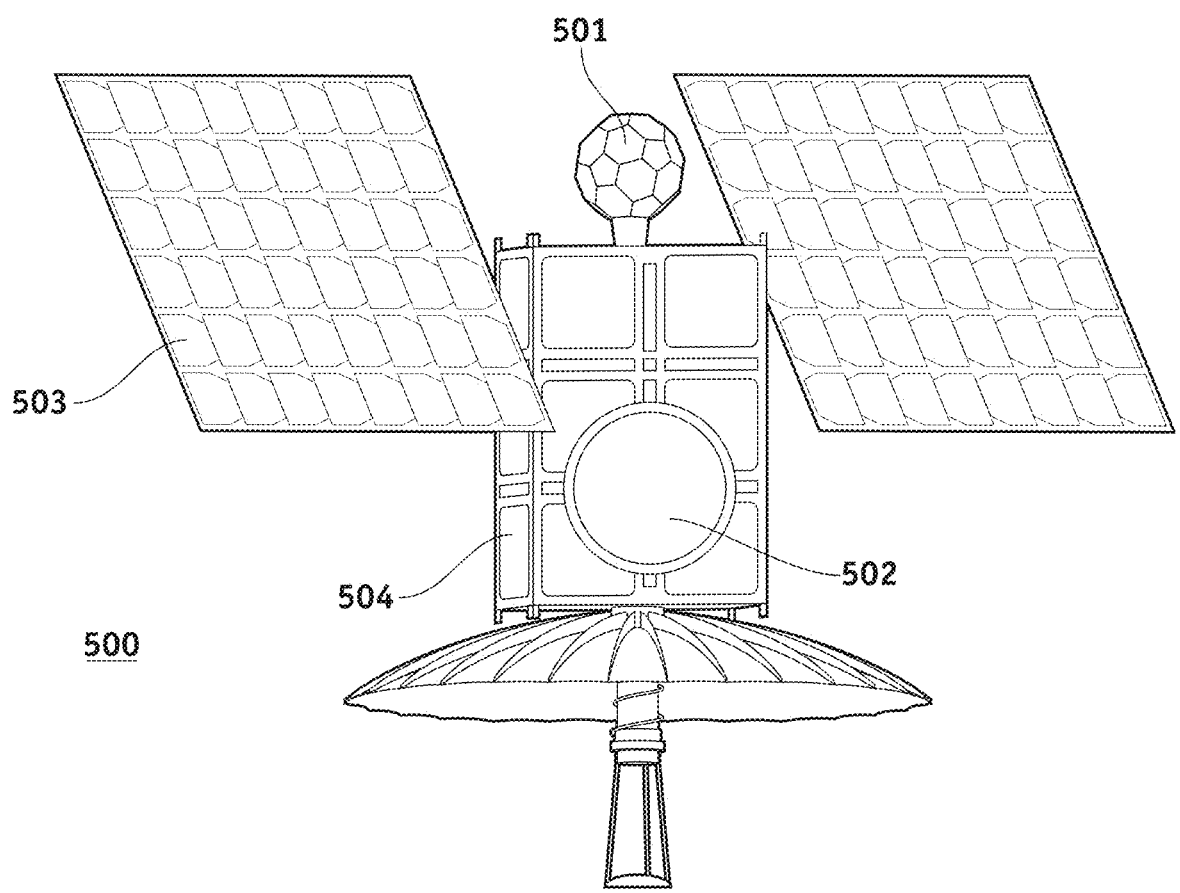
FIG. 5 shows a miniaturized satellite ("smallsat").

FIG. 5 shows an exemplary smallsat (500) including an (ISOC), inter-spacecraft optical communicator (501), an (LROC) long range optical communicator (502), solar panel (503), and a housing module (504) including electronic devices, instruments, and sensors. More details about functionalities and structure of ISOCs and LROCs can be found in the above-mentioned U.S. Pat. No. 10,707,966 B2 and U.S. Pat. No. 10,581,525 B2 respectively, both of which are incorporated herein by reference in their entirety.

Implementation of IPNs involves large orbital maneuvering vehicles (OMVs), each containing, for example, 50-100 smallsats, to deploy swarms from low-Earth orbit (LEO) or geosynchronous transfer orbit (GTO) to their final destination. OMVs may be about 5 meters in diameter and can be launched into space using conventional launching rockets. Once the OMV reaches its target location within the solar system, it will deploy the spacecraft swarm for subsequent insertion into their final orbital destination.

The optical communications systems to be carried by the IPN ships will provide fast connectivity along the solar system. According to the teachings of the present disclosure, pulse position modulation may be employed as the default IPN modulation. Such modulation has been analyzed by the inventor and various capacity equations based on Poisson channel models have been evaluated. Analysis of optical data rate (capacity) as a function of received power showed three modes of operations for the optical terminal, namely: bandwidth-limited, quantum-limited and noise limited. Performance is greatly improved in terms of capacity by using large spacecraft swarms. Families of capacity plots have been developed as a function of range for various PPM conditions. These preliminary results show that near gigabit connectivity could be achieved in the cislunar and inner solar system IPN subnets, whereas multi-megabit communications can be achieved along the outer solar system planets.

Figure 6A:
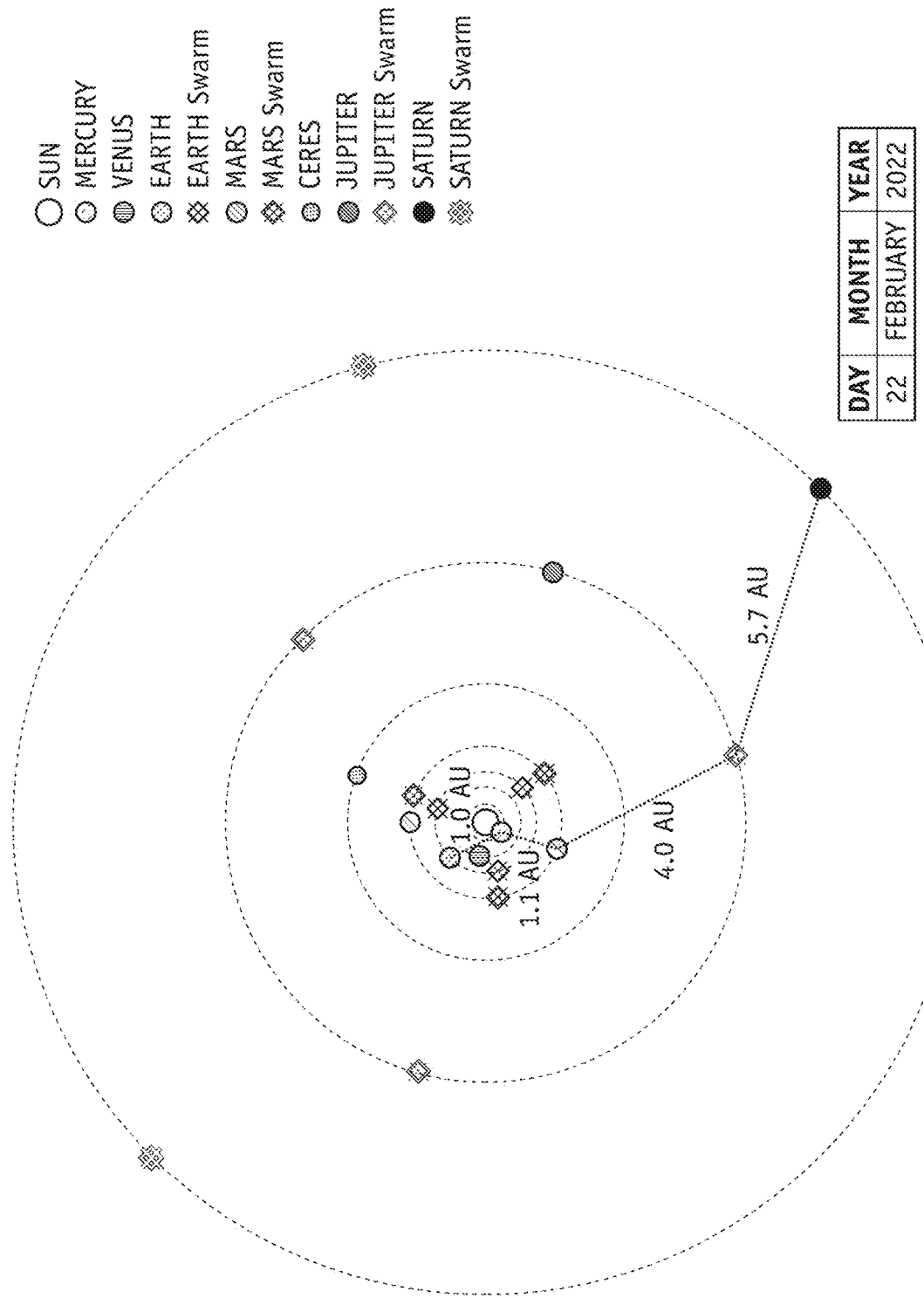
FIG. 6A shows an image of the planets' location along the solar system.
Figure 6B:
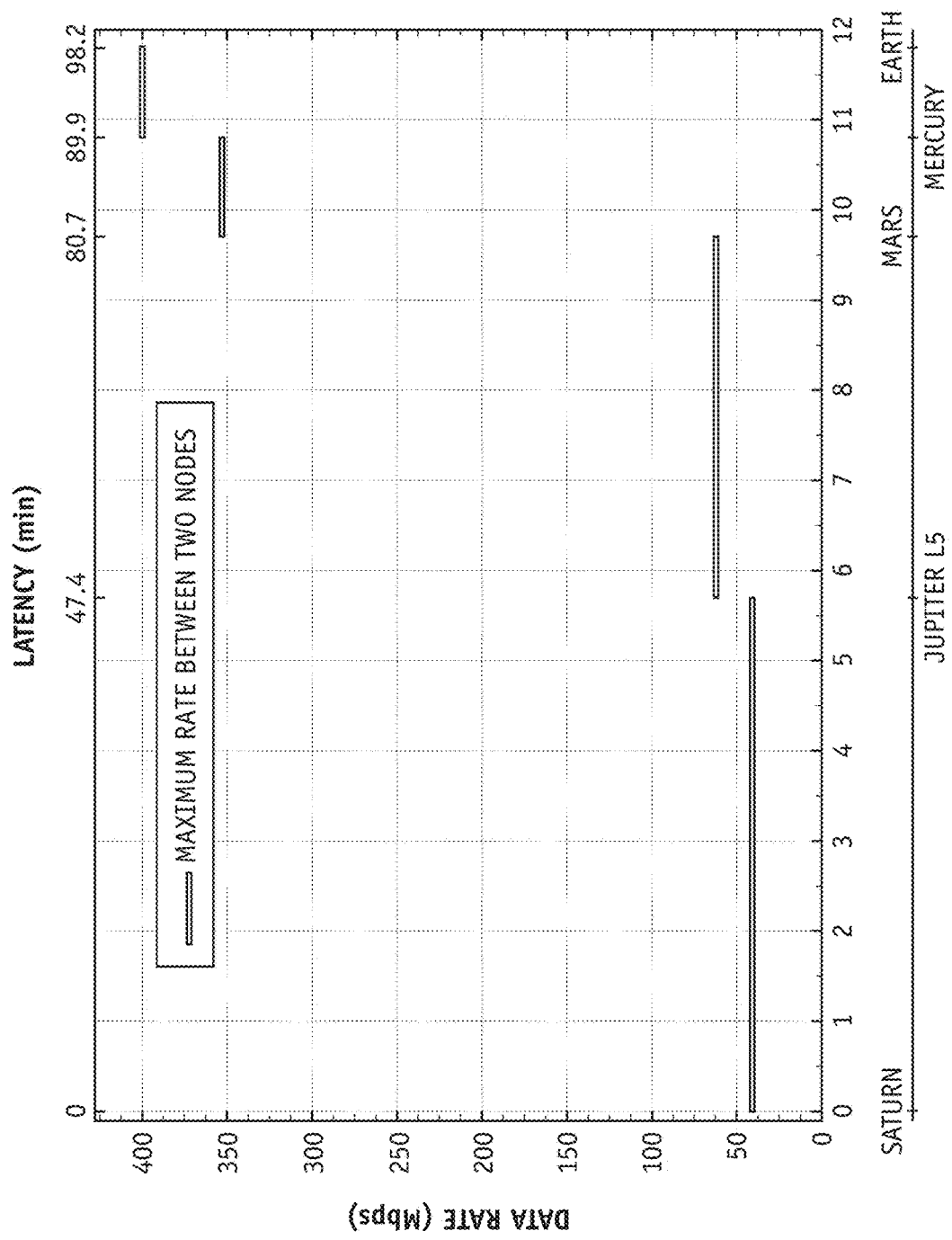
FIG. 6B shows possible data rates between the node of an interplanetary network nodes and the associated latency.

FIG. 6A shows an image of the planets' location along the solar system for February 2022 when Saturn is in conjunction with and farthest away from Earth. Also shown is a potential connectivity path between Saturn and Earth via several IPN nodes. FIG. 6B shows possible data rates between IPN nodes and the associated latency for the same Saturn-Earth data link. For the sake of simplicity only 3 nodes (swarms) per planet are shown. Due to the longer distance in play, connectivity between Saturn and Jupiter L5 node is the slowest (about 40 Mbps). The link latency is 98 minutes as shown. When uninterrupted connectivity is required among IPN nodes, the maximum data rate of the entire link would be dictated by the slowest link (i.e., about 40 Mbps).

The spacecraft swarms deployed as part of an IPN may be small (e.g. CubeSats®), affordable and could include integrated propulsion, telecommunications and sensor payloads. The disclosed IPN spacecraft swarms can be configured to relay information from assets orbiting planets (or located on planetary surfaces) to Earth. In addition, the IPN swarms can be furnished with suitable sensors to form a large science platform for observation, visitation, and an increase in knowledge and understanding of the solar system.

Figure 7:
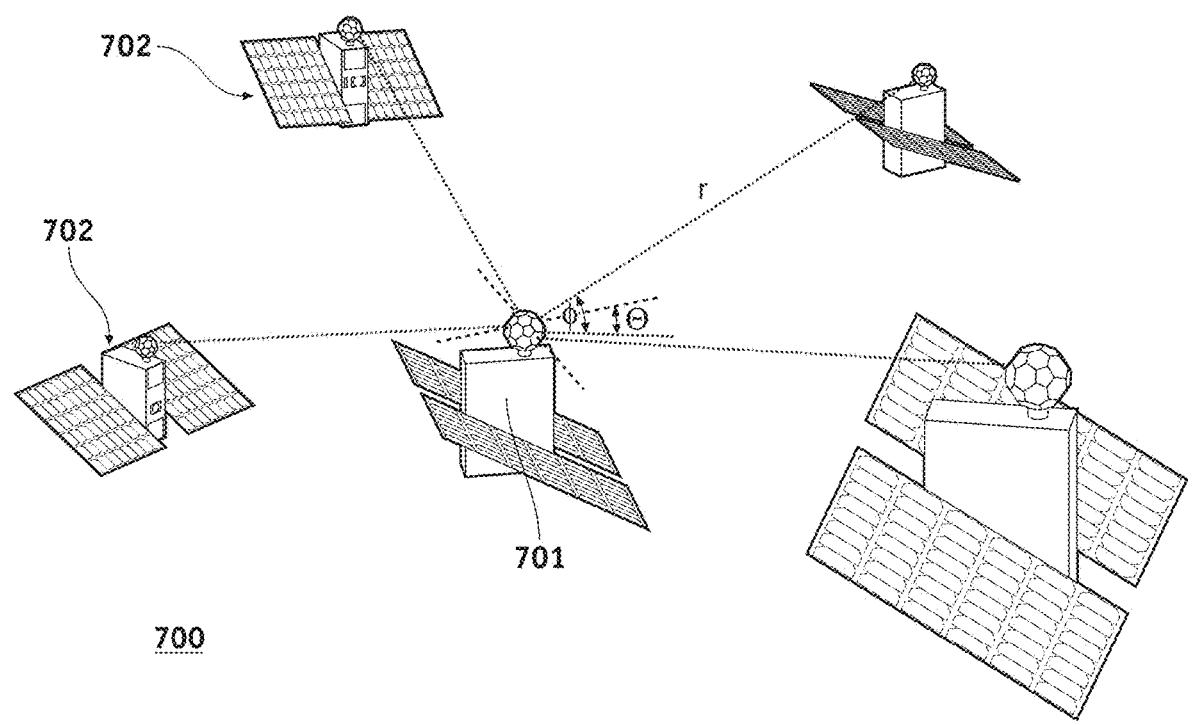
FIG. 7 shows a spacecraft swarm.

FIG. 7 shows an exemplary spacecraft swarm (700) including a leader spacecraft (701) disposed in the middle of the swarm (700) and one or more follower spacecrafts (702) surrounding the leader spacecraft (700). Each of the spacecraft (701, 702) implement an ISOC which uses an array of optical detectors distributed along its spherically shaped body to continuously determine the angle-of-arrival (AOA) of the laser beams produced by the other spacecraft. The AOA algorithm allows for calculation of the azimuth and elevation of each incoming optical beam. These angles can be calculated with millidegree accuracy. Range between spacecraft can be calculated with additional processing. The ISOCs, in addition to providing super-fast communications, provide means for measuring the position (r, phi, theta) of the surrounding ships. The leader spacecraft (701) is able to collect the positional information of the other spacecraft within the swarm using its respective ISOC. Position information is to be gathered continuously (e.g. several times per second) so that information about the location of each spacecraft within the swarm (700) is known at all times. In other words, the ISOC allows for continuous metrology (calculation of $(r,\phi,\Theta)$) among spacecraft forming a swarm. This is further described in what follows.

With continued reference to FIG. 7, according to an embodiment of the present disclosure, the follower spacecrafts (702) turn on their lasers intermittently (every few milliseconds) in the direction of the leader spacecraft (701). The leader spacecraft ISOC, every time it detects a laser beam, calculates azimuth, elevation and range of the follower spacecraft generator of that beam, hence obtaining $(r,\phi,\Theta)$ coordinates of that ship. Because ISOC uses a fast FPGA processor, r, $\phi$, and $\Theta$ could be updated every microsecond—however, ISOC updates are typically obtained every millisecond. The metrology protocol runs continuously on the leader so that position information of the entire swarm is updated hundreds of times per second.

In addition to playing a role of network communication nodes, the swarms as disclosed, will also operate as a distributed science instrument. In an embodiment, each IPN spacecraft will carry a suite of miniaturized instruments to perform unique science by unique collecting spatio-temporal measurements.

Spacecraft formation flying is poised to improve the design of future space missions by reducing cost and enhancing capabilities simultaneously. According to the teachings of the present disclosure, formation flying is a concept of distributing the functionality of large spacecraft among several smaller, less expensive, cooperative smallsats. In a spacecraft swarm, multiple spacecrafts can work together in a group to accomplish the objective of one larger, usually more expensive, satellite. Coordinating smaller spacecrafts has many benefits over single larger spacecraft including simpler designs, faster build times, cheaper replacement creating higher redundancy, unprecedented high resolution, and the ability to view research targets from multiple angles or at multiple times. These qualities make them suitable for astronomy, communications, meteorology, and environmental uses.

As previously disclosed, each IPN swarm includes a large number of smallsats, for example, in the range of 50 to 100 spacecrafts per swarm. In various embodiments, each smallsat may be 6 U or 12 U and weigh between 10 to 20 kilograms. The smaller swarms may be made of 12 U smallsats whereas the larger ones may be formed by 6 U ships. This means that the largest swarms may have a total mass of about 1000 kg.

According to embodiments of the present disclosure, the spacecraft swarms may be deployed to orbit a target planet itself or to orbit its Lagrange points. In an exemplary swarm arrangement for orbiting planetary bodies is described in mode details.

According to the teachings of the present disclosure, each swarm acts as a network node. In an embodiment, a smallsat similar to smallsat (500) of FIG. 5 may be implemented. Each smallsat uses an ISOC for intranet connectivity and a long-range optical communicator (LROC) for long-range internet connectivity. In order to use relay nodes along the solar system, IPN smallsats may use optical apertures with large diameters (e.g., diameters in the 0.5 to 2 m range) or use large amount of transmit power. This would be challenging to achieve with a single terminal like LROC.

Figure 8A:
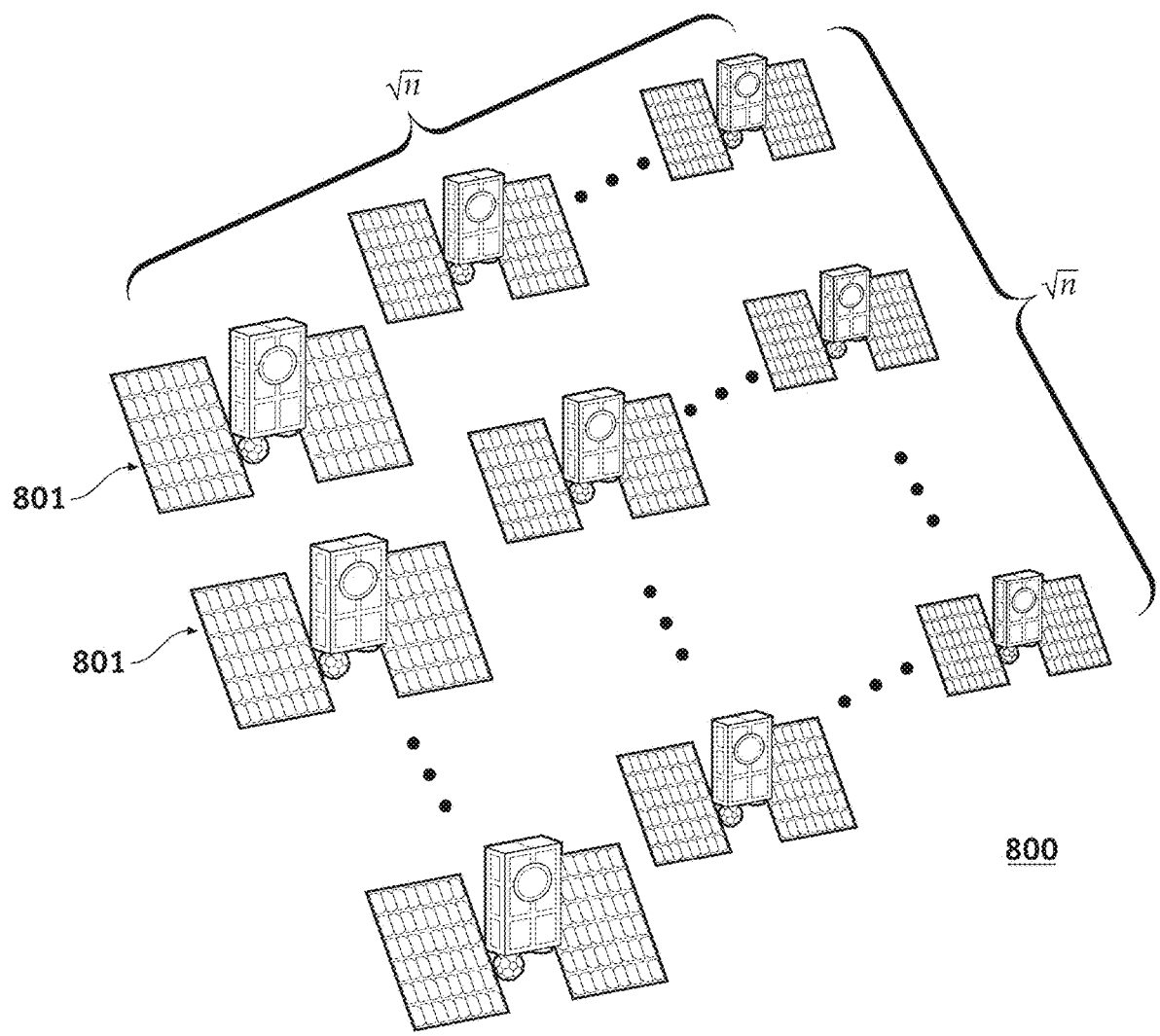
FIG. 8A shows an exemplary interplanetary network arrangement.

FIG. 8A shows an exemplary IPN swarm (800) arrangement where each spacecraft is furnished with both ISOC and LROC optical terminals. For the sake of example and not of limitation, all terminals are assumed to have identical performance and are pointing in the same direction. It is also assumed that there are $\sqrt{n}$ rows and $\sqrt{n}$ columns of spacecraft in the swarm which yields a total of n terminals. Under these assumptions, the total transmitted power by the swarm, $P_t^s$, is given by, $$P_t^s = \eta_{ct}\sum_i^n P_{t_i} \quad (1)$$

where $P_{t_i}$ is the power transmitted by the $i^{th}$ terminal and $\eta_{ct}$ is the power combining efficiency of the transmit swarm. If all terminals transmit the same amount of power (i.e., $P_{t_1}=P_{t_2}=\ldots=P_{t_n}$) then, $$P_t^s = \eta_{ct}nP_t \quad (2)$$

The combining efficiency $\eta_{ct} \leq 1$ accounts for any mismatch and misalignment within the array.

It should be noted that the power combining discussed above does not need to be coherent at the optical level. There just is a need to synchronize the modulating optical pulses produced by each transmit terminal. In this case, the duration of the optical pulses could range from tens of picoseconds to nanoseconds. In order for each spacecraft to emit an optical pulse at the same time, there should be a way to synchronize the emission of these pulses. In an embodiment, in order to synchronize the transmit pulses the ISOCs are used as means to send a trigger signal from the swarm leader to the followers. In another embodiment, this is performed by using very accurate clocks on each spacecraft. If the clocks are very accurate, they can emit pulses at preset times. Also, each smallsat may have knowledge of its distance (range) to the leader so that it can apply the appropriate delay before it emits its optical pulse.

With further reference to FIG. 8A, on the receiver swarm, the power received by a total of m terminals is now given by $$P_r^s = \eta_{cr}\sum_i^m P_{r_i} \quad (3)$$

where $P_{r_i}$ is the power received by the $i^{th}$ terminal and $\eta_{cr}$ is the combining efficiency of the receive swarm. Similar to the transmit side, assuming all terminals capture the same amount of power (i.e., $P_{r_1}=P_{r_2}==P_{r_m}$), the total power received by the receive swarm, $Ps_r$, is given by $$P_r^s = \eta_{cr}mP_r \quad (4)$$

On the receive swarm, each of the smallsats will receive an amount of power $P_r$. The information about the power level measured by each smallsat would need to be shared with the leader (either via analog or digital signals) so it can be power-combined by the leader in order to determine the total amount of power received by the swarm. The noise in the detection system of each smallsat may play a bit role on the measurement of the detected power. Care must be taken in order to minimize or reduce optical noise on each receiver.

Figure 8B:
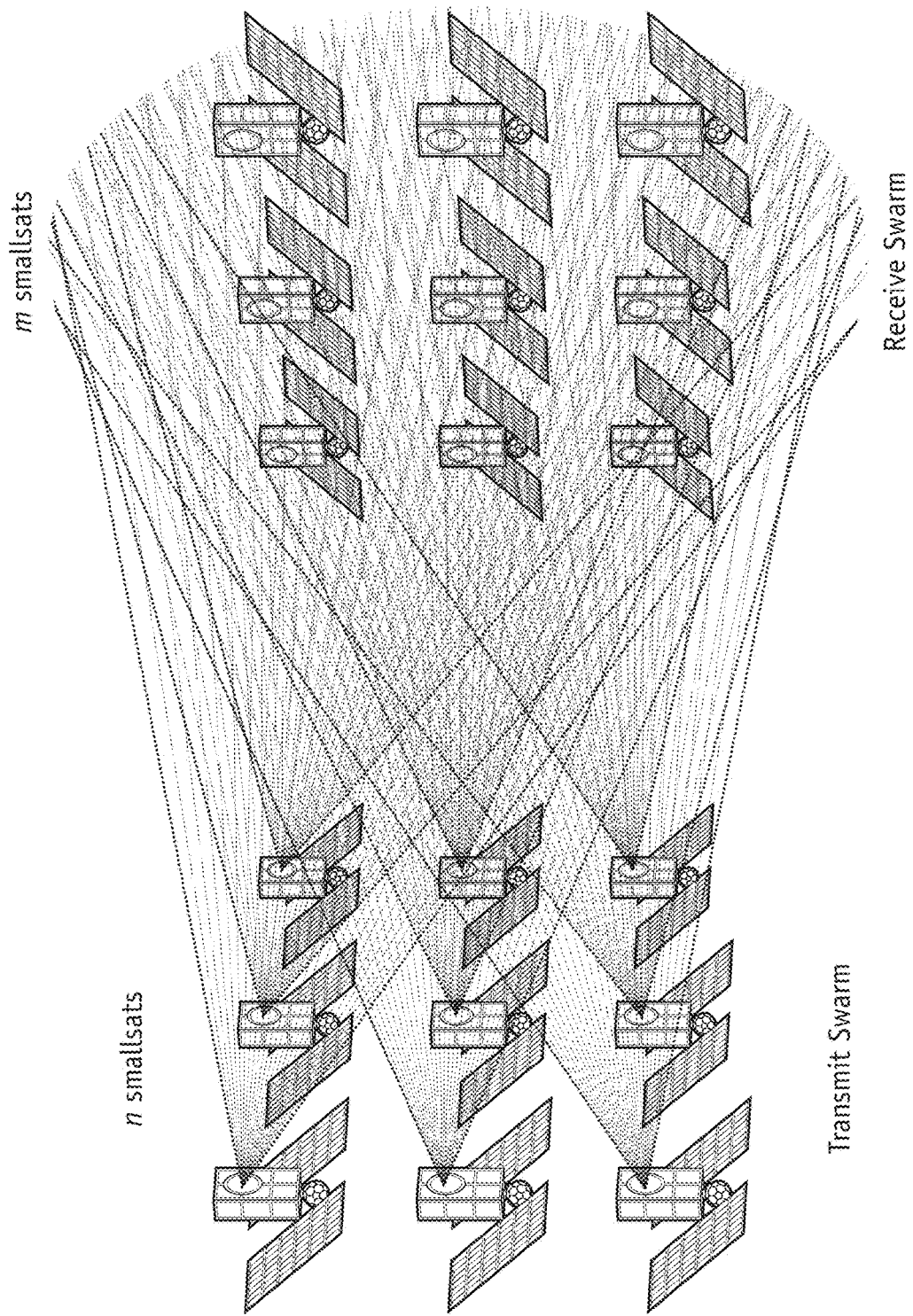
FIG. 8B shows transmit and receive spacecraft swarms.

FIG. 8B illustrates graphically what was disclosed above in terms of synchronizing the transmit and receive swarms. When all the smallsats are synchronized to transmit or receive optical signals, the connectivity performance of the IPN node is substantially improved. On transmit, the total transmitted power could be increase by a factor of n. On receive, the received power could also be increased by a factor of m (where n and m are the number of smallsats in the transmit and receive swarm, respectively). The synchronized swarms allow the IPN nodes to connect at distances of several astronomical units.

The IPNs as disclosed, may also be used as a space positioning system (SPS), wherein larger spacecrafts and smallsats roaming the solar system will use an ISOC to communicate with the IPN nodes. In such system, both larger spacecrafts and smallsats, using their ISOCs, could receive beams from one or several IPN nodes to determine their position within the solar system. The position of each IPN node will be known based on standard position information obtained from terrestrial stations such as NASA's Deep Space Network (DSN).

In other embodiments, the disclosed IPNs may be used as part of a space bistatic radar deploying a large transmitter on the ground. The IPN nodes are used as receivers for detecting asteroids and space assets. Each smallsat forming the IPN node may have a receiver that works at the same frequency as the transmitter. Such radar can be used for planetary defense and debris monitoring.

All of the references in the present application, shown in the reference list below, are incorporated herein by reference in their entirety.

REFERENCES

[1] JUNO Mission to Jupiter. https://www.jpl.nasa.gov/missions/juno/
[2] InSight Mission to Mars. https://www.jpl.nasa.gov/missions/insight/[3]
[3] The Deep Space Network. https://deepspace.jpl.nasa.gov/
[4] M. de Kok, J. E. Velazco, and M. J. Bentum, "CubeSat Array for Detection of RF Emissions from Exoplanets using Inter-Satellites Optical Communicators," in IEEE Aerospace Conference Proceedings, 2020.
[5] Israel, D. et. al, 2020. "LunaNet: a Flexible and Extensible Lunar Exploration Communications and Navigation Infrastructure and the Inclusion of SmallSat Platforms," Proceedings of the AIAA/USU Conference on Small Satellites, Communications, SSC20-XII-03. http://digitalcommons.usu.edu/smallsat/2020/all2020/171/.

The invention claimed is:

1. An interplanetary satellite network (IPN) deployed across a plurality of planets of a solar system, the IPN comprising a plurality of miniaturized satellite swarms, each swarm forming a node of the IPN, the node being located at a Lagrange point of a corresponding planet with reference to the Sun, and wherein:
    the plurality of planets comprises Earth, Mercury, Venus, Mars, Jupiter, Saturn, Uranus, Neptune and Pluto, and
    each miniaturized satellite is configured to optically communicate with miniaturized satellites of a same swarm and miniaturized satellites of other swarms of the IPN.

2. The IPN of claim 1, comprising a first subnetwork deployed across an inner solar system, a second subnetwork deployed across an outer solar system, and a cislunar subnetwork.

3. The IPN of claim 2, wherein the cislunar subnetwork comprises a geostationary orbit subnetwork including a set of miniaturized satellite swarms equally spaced along a geostationary orbit.

4. The IPN of claim 3, wherein the cislunar subnetwork comprises a gateway, a lunar radio telescope disposed at a second Earth-Moon Lagrange point, lunar ground assets including robots and rovers, and Earth ground stations.

5. The IPN of claim 4, wherein the miniaturized satellite swarms of the cislunar subnetwork are configured for connection to the lunar ground assets.

6. The IPN of claim 4, wherein the gateway is configured to establish communications between the lunar ground assets and Earth ground stations.

7. The IPN of claim 3, further comprising a ground network comprising eight ground complexes arranged 45-degrees apart in longitude.

8. The IPN of claim 7, wherein each ground complex comprises optical stations configured to provide a duplex connectivity with the swarms of the geostationary orbit IPN.

9. The IPN of claim 2, wherein the cislunar subnetwork comprises a subnetwork including a set of miniaturized satellite swarms equally spaced along a first Earth-Moon Lagrange point (L1) orbit and a second Earth-Moon Lagrange point (L2) orbit.

10. The IPN of claim 1, wherein each miniaturized satellite swarm comprises:
- an inter-spacecraft optical communicator configured to establish optical communication among miniaturized satellites within the same swarm; and
- a long range optical communicator configured to establish optical communications among miniaturized satellites of different swarms.

11. The IPN of claim 10, further comprising solar panels.

12. The IPN of claim 1, wherein transmission and reception of signals by the miniaturized satellites are synchronized to produce a desired optical synthetic aperture.

13. The IPN of claim 8, wherein each ground complex further comprises an auxiliar phased-array antenna station.

14. The IPN of claim 1, implemented as a space positioning system, the IPN further comprising one or more additional spacecrafts, and wherein:
- each miniaturized satellite and the one or more additional spacecrafts are configured to receive optical beams from one or more nodes of the IPN to determine a position of the miniaturized satellite and the one or more additional spacecrafts in the solar system, and
- position of each of the IPN nodes is obtained based on a standard position information obtained from terrestrial stations including NASA's deep space network.

15. The IPN of claim 1, implemented as a bistatic radar comprising:
- a transmit radar on Earth ground, the transmit radar having a transmit frequency, wherein each miniaturized satellite comprises a receiver tunable at a same frequency as the transmit frequency.

* * * * *